Figure 1:
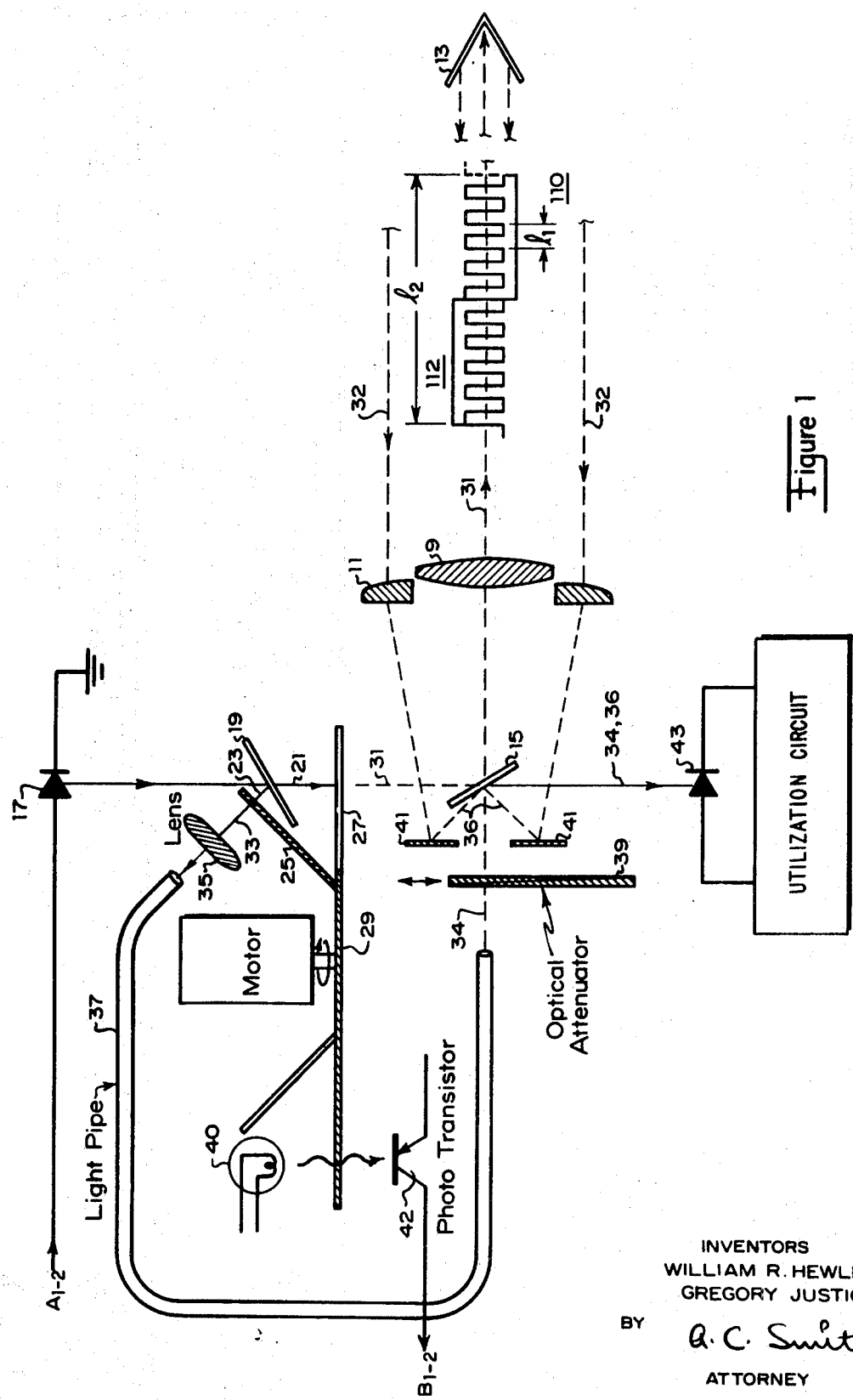

United States Patent

[11] 3,619,058

| [72] | Inventors | William R. Hewlett<br>Palo Alto;<br>Gregory Justice, Mountain View, both of Calif. |
|---|---|---|
| [21] | Appl. No. | 879,291 |
| [22] | Filed | Aug. 24, 1969 |
| [45] | Patented | Nov. 9, 1971 |
| [73] | Assignee | Hewlett-Packard Company<br>Palo Alto, Calif. |

[54] DISTANCE MEASURING APPARATUS
11 Claims, 4 Drawing Figs.

[52] U.S. Cl................................................. 356/5,
324/83, 250/204
[51] Int. Cl.................................................. G01r 25/00,
G01c 3/08
[50] Field of Search....................................... 324/83, 86;
356/5; 343/7.5, 13, 113; 250/204

[56] References Cited
UNITED STATES PATENTS

| 2,956,472 | 10/1960 | Hildebrand.................. | 356/5 |
| 3,428,815 | 2/1969 | Thompson.................... | 356/5 |
| 3,216,010 | 11/1965 | Roeschke..................... | 343/7.5 |
| 3,521,283 | 7/1970 | Angelle........................ | 356/5 |

OTHER REFERENCES

Geodolite-Model 3, Spectra Physics, 3-1968, Laser Distance Meas Instrument.

Primary Examiner—Rodney D. Bennett, Jr.
Assistant Examiner—S. C. Buczinski
Attorney—A. C. Smith ABSTRACT: The phase of a modulated light carrier signal that is transmitted to and reflected back from a distant reflector is compared with a reference modulated light carrier signal to provide a direct readout of distance to the reflector. The reference and reflected light carrier signals are chopped alternately and measured in a signal circuit that reconstructs the phase information on the chopped signals for continuous analysis and readout directly in distance.

DISTANCE MEASURING APPARATUS

BACKGROUND OF THE INVENTION

Certain known distance-measuring instruments use noncoherent light waves as the carrier for a modulated signal which is transmitted to a distant reflector and then received back for comparison with the phase of a reference modulated light signal. The path length of the reference signal may then be altered to establish phase coincidence between the reference signal and the transmitted-reflected signal. The mechanism for altering the length of the reference path thus provides an indication of the distance to the reflector as a fraction of a wavelength of the modulated light signals. One disadvantage encountered with instruments of this type is that the length of the reference path may have to be altered over a considerable range in order to establish phase coincidence of the modulated signals being compared. Also, the distance indication derived from the length of the reference path is not specific with respect to the distance to the reflector in number of wavelengths of the modulated signal.

SUMMARY OF THE INVENTION

Accordingly, the preferred embodiment of the present invention alternately chops the portion of modulated light carrier signal being transmitted and reflected over the path the length of which is to be measured and the portion being conducted over a reference path and then reconstructs each of these signals as continuous wave signals containing the phase information of the chopped reference and reflected light carrier signals. The phase information contained in these reconstructed waves are then measured to provide a direct readout of the distance along the path being measured. The redundancies in the distance indication in terms of the number of wavelengths of the modulated signal are resolved by altering the modulating frequencies, and hence, wavelengths as the readout is adjusted to obtain the desired indication of the distance to the reflector in fractions, units, tens, hundreds and thousands of feet (or meters).

DESCRIPTION OF THE DRAWING AND PREFERRED EMBODIMENT

FIGS. 1-4 comprise the pictorial and schematic diagram of the circuit and apparatus of the present invention.

Referring now to FIG. 1, there is shown an optical system including concentrically arranged transmitter and receiver lenses 9, 11 and cube-corner reflector 13 disposed at the end of the distance to be measured with respect to the reference plane of the present instrument. This reference plane may be adjusted as a distant offset, as later described, but typically closely coincides with the reflection corners at reflector plate 15 which, in turn, may be conveniently aligned with the mounting axis of the instrument. A light source 17 such as a gallium arsenide electroluminescent diode whose light intensity may be varied at high frequencies is disposed to project light onto a beam splitter 19 where the light beam is separated into a transmit portion 21 and reference portion 23. The light source 17 may be turned on and off at frequencies ranging from about 15 kilohertz to about 25 Megahertz, as later described. These modulated light beams 21 and 23 are separately and alternately transmitted and blocked in phase opposition by the separate portions 25, 27 of shutter wheel or light chopper 29. The chopped transmit portion 31 is reflected from the surface of reflector plate 15 through transmitter lens 9 toward the remote reflector 13 and the chopped reference portion 33 is directed along the reference path through lens 35, light pipe 37 and light attenuator 39 to the backside reflective surface of reflector plate 15. No mixing of transmit portion 31 and reference portion 33 of the light beams occurs at reflector plate 15. However, the reflected portion 32 of the transmitted light 31 that is received through the outer concentric lens 11 reflects from plate 41 onto the backside surface of reflector plate 15 where it is combined with the reference portion 33 that is directed along the reference path. The combined modulated reference light signal 34 and the received modulated light signal 36 are thus applied alternately and cyclically to the photodiode or other light signal detector 43 for measurement of the phase relationship between the received and reference portions of the modulated light signals. A chopper signal 38 for synchronous control of portions of the present circuit is provided by alternately and cyclically chopping the light from source 40 applied through the shutter wheel 29 to the photoresponsive diode or transistor 42 connected to trigger the chopper signal generator 44. Because of the directionality of reflected light from cube-corner reflector 13, the concentric transmitter and receiver lenses 9 and 11 provide enhanced light signal coupling, particularly over short distances, between the transmitter optics, the reflector 13 and the receiver optics. The transmitter lens 9 has a shorter focal length than the receiver lens 11 so that the reflector plate 15 may be conveniently positioned intermediate the lenses 9, 11 and the reflector 41.

Referring now to the figures of the drawing, the electroluminescent diode light source 17 is turned on and off at frequencies which are varied in decade increments from about 25 kilohertz to about 25 Megahertz in response to the adjustment of readout switches 101-107, as later described. Actually, these frequencies are precisely related in accordance with published data to the speed of light for given temperature and pressure conditions of the atmosphere through which distance is being measured. For the English system of units, the frequencies are decade multiples of approximately 24.58244 kilohertz and for the metric system of length measurement, the frequencies are decade multiples of approximately 14.98545 kilohertz. These modulating or RF frequencies for the light source 17 are supplies by frequency synthesizer 45 and are corrected at a given decade multiple for temperature and pressure conditions by the environmental sensors 47. The synthesizer 45 also supplies a reference frequency 52 at, say, the lowest multiple RF frequency of 24.58244 kilohertz for the English system of units. The RF signal from synthesizer 45 is applied to power amplifier 49 for driving the light source 17 at these high frequencies and is also applied to the mixer 51 where it is combined with the output of local oscillator 53. This oscillator 53 is controlled by the phase detector 55 which is connected to receive the reference frequency 52 and the output of mixer 51 for maintaining the output of oscillator 53 at a frequency which is separated from the decade multiples of RF signal by the fixed reference frequency 52. This output from oscillator 53 and the modulated reference and received light signals 34, 36 are applied to photodetector diode 43 where they are mixed to produce an I.F. signal at the reference frequency 52 that is selected and amplified by I.F. amplifier 57.

It should be noted that the photodetector diode 43 is always coupled through the elements forming the receiver optics 15, 41 and 11 to receive the ambient light conditions of the environment being measured and that these conditions are alternately and cyclically modified by the reference signal 34 and received signal 36 applied to the diode 43. This has the advantage that the signal conditions on detector diode 43 remain more nearly uniform during alternate chopper half cycles compared with an arrangement of the optics and chopper which exposes a detector alternately to ambient light plus reflected light signal and then only to the internal reference light signal. Since the detector diode 43 is a nonlinear device which produces the desired detected signal with an amplitude that is a function of the bias current, light intensity, and the like, changes in light intensity tend to change bias conditions and these changes become converted into phase changes by the nonlinear characteristics of the diode 43, which phase changes can produce undesirable errors in the distance measurement. Thus, by maintaining more nearly uniform signal detector conditions on detector diode 43 over the full cycle of chopper operation, the present instrument is capable of resolving time delays of approximately $2 \times 10^{-12}$ seconds which is indicative of a few thousandths of a foot change in distance.

Figure 2:
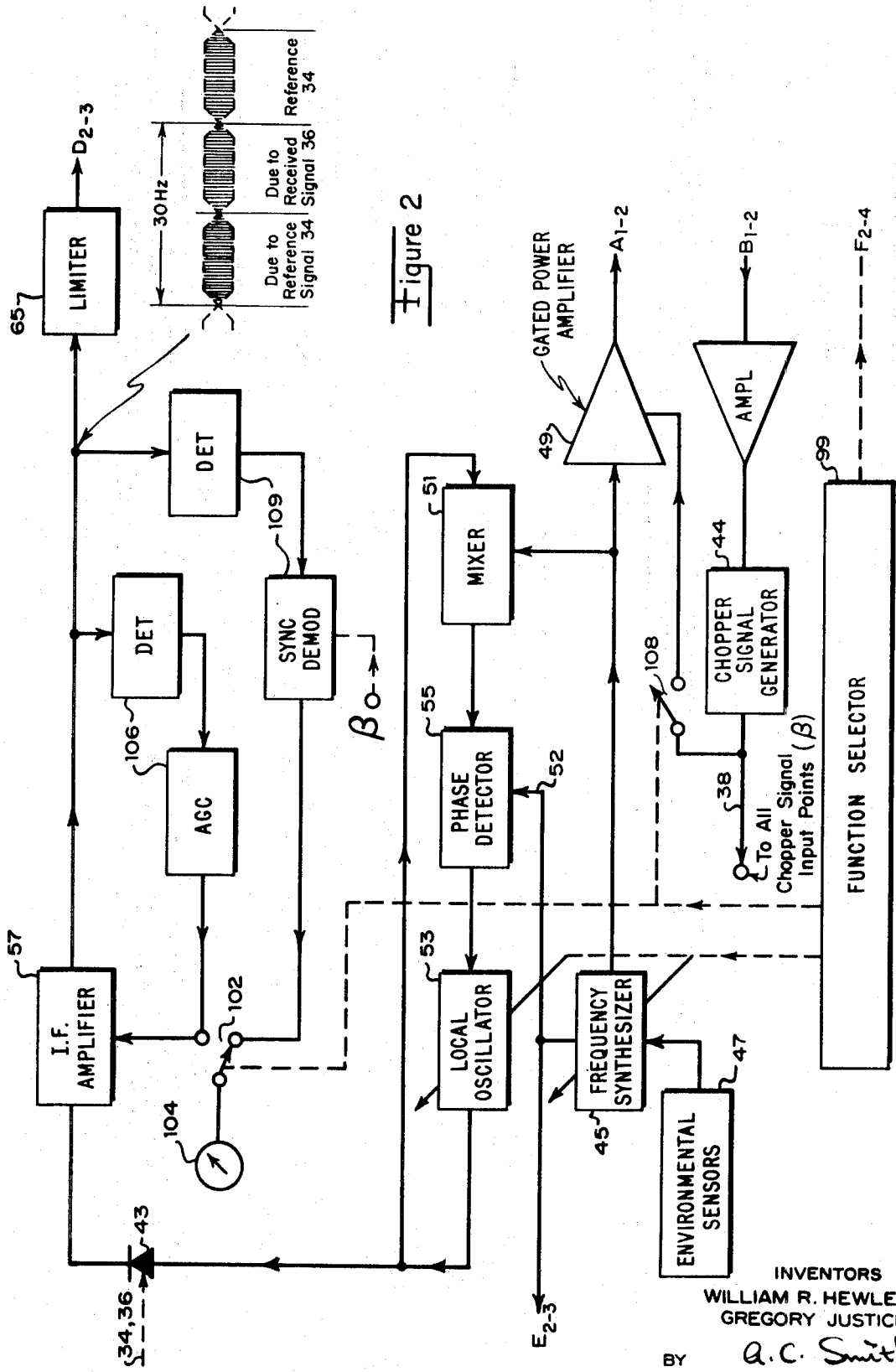
Figure 3:
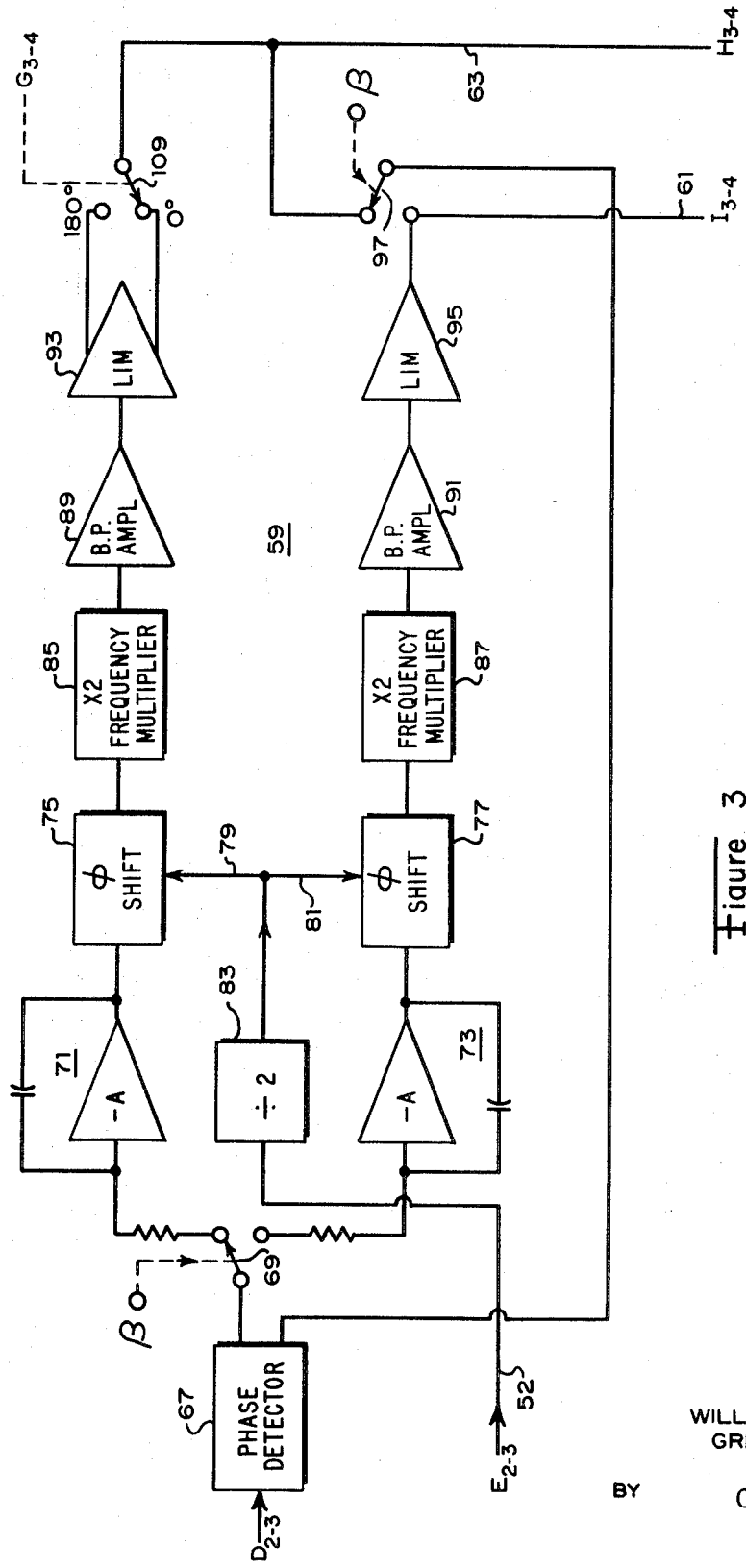
Figure 4:
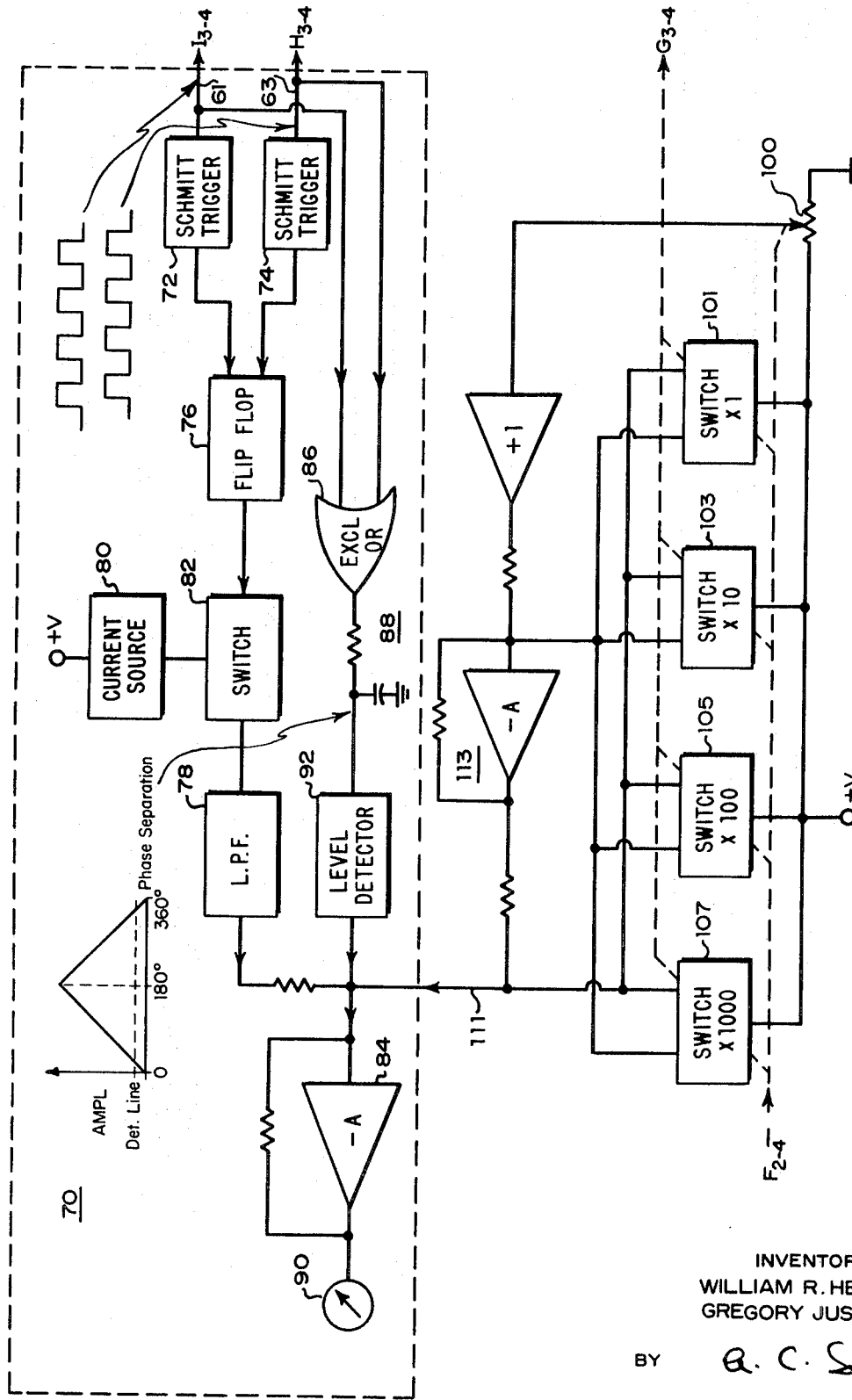

The signal at the output of I.F. amplifier 57 thus changes cyclically and in sequence at the chopper signal rate (say, about 30 hertz) from the I.F. signal indicative of the detected receiver signal 36 to the I.F. signal indicative of the detected reference signal 34, and so on, with a waveform as shown in FIG. 2. The square wave signals at the reference of I.F. frequency of about 25 kilohertz occurring within the half-cycle bursts controlled by the shutter wheel 29 thus contain the relative phase information that is representative of the distance to be measured.

The following circuitry shown schematically in FIG. 1 is provided to measure the phase separation of these two groups of alternately recurring signals.

The channel separating circuit 59 produces a pair of continuous signals on separate output lines 61, 63 which contain the relative phase information contained in the signals that appear alternately and intermittently during the chopped half-cycle bursts present at the output of I.F. amplifier 57. The signals from I.F. amplifier are shaped and clipped to a selected level by limiter 65 to provide the desired signals with sharp wave fronts. These signals occurring during the half-cycle bursts are separated and applied to the respective ones of two similar signal channels by the operation of the phase detector 67 and the switch 69 that operates in synchronism with the chopper signal. Each channel includes an integrator 71, 73 which supplies a DC voltage to a voltage-controlled phase shifter 75, 77 of conventional design for shifting the phase of continuous wave signals 79, 81 applied thereto. These continuous wave signals are divided down from the reference frequency 52 by divider 83. The outputs of the phase shifters 75, 77 are continuous wave signals which are doubled in frequency by multipliers 85, 87, are amplified by band-pass selective amplifiers 89, 91, and are applied to limiters 93, 95. The frequency doubling provided by multipliers 85, 87 alters the effective wavelength of the RF-modulated transmitter light signal, as later described. The limiters 93, 95 may be flip-flops or other similar trigger circuits which change state on each transition (or peak or zero crossing) of the continuous wave signals applied thereto to produce square wave signals on outputs 61 and 63. This results in a doubling of the frequency and for this reason limiter 65 may include a frequency doubler so that the phase detector 67 may compare signals at the same frequency. Switch 97 operates in synchronism with chopper signal $\beta$ to alternately apply the outputs 61 and 63 to phase detector 67 for comparison with the phase of signals during the corresponding half-cycle bursts to supply to the appropriate integrator 71, 73 through switch 69 the DC voltage representative of phase error between the input signal in a half-cycle burst and the corresponding output signal on line 61, 63. In this way, the phase information on the continuous output signals on lines 61, 63 is maintained as an accurate representation of the phase information contained in the signals that appear in the alternate half-cycle bursts at the output of I.F. amplifier 57. The continuous square wave signals on lines 61 and 63 thus have wave fronts that are separated in phase in proportion to the phase separation between the reference modulated light signal 34 and the received modulated light signal 36. And this phase separation is indicative of the position of the remote reflector away from a reference point (say, zero phase angle) in a full wavelength of the modulated light signal. Thus, movement of the remote reflector (or of the measuring instrument relative thereto) over a full wavelength of the modulated light signal causes the phase separation of the signals on output lines 61 and 63 to vary from 0 to 360°

The phase separation of the signals appearing on lines 61 and 63 is measured by applying these signals to a converter 70 including a Schmitt trigger 72, 74. The signals on the lines 61 and 63 control the conduction time of flip-flop 76 to coincide with the phase separation of the two signals on lines 61 and 63. Current supplied to the low pass filter (or DC averager) 78 from source 80 through the switch 82 which is controlled by flip-flop 76 thus supplies an output signal to the input of the meter amplifier 84 that increases linearly with increasing phase separation of the signals on lines 61 and 63. This signal is nulled out by switch-selected signals, as later described, to provide the desired readout of distance to the remote reflector 13 directly from the switch settings. Also, an additional circuit is provided to detect the proximity of the signals on lines 61 and 63 to 0° and 360° degree end limits of the phase separation-to-signal conversion provided by the converter circuit 70. This additional circuit includes exclusive OR-gate 86 which is connected to receive the signals on lines 61 and 63 for producing an output when the inputs are of opposite phase and for producing no output when the inputs are of the same phase. The output of the gate 86 is to integrator 88 for producing at the output thereof a steady voltage that increases for increases in phase separation of the signals on lines 61 and 63 from 0° to 180° phase angle and then decreases for increasing phase separation form 180° to 360°. The level detector 92 connected to the output of the integrator may thus be set to respond to values of integrator output below a selected level and supply a current to meter amplifier 84 that drives the meter 90 offscale so that no null can be attained. Since this response level of level detector relates to the phase separation of the signals on lines 61 and 63 about the 0° and 360° ends of the phase range and, hence, to the increments of distance within one decade of distance units, this set level may be chosen approximately equal to distance-switch settings up to 0, 1, 2 or above 8, 9 (or decadic multiples thereof). Thus, as the settings of distance-switches 101-107 are altered in sequence, as later described, each on of these switches in turn may actuate switch 109 at the output of limiter 93 in the channel-separating circuit 59 to select the complementary output and thereby shift the response of the converter circuit 70 and of the circuit 86, 88, 92 by 180° to the center of the response characteristics of these circuits. Ambiguities about the end points of the phase ranges are thereby eliminated.

The operation of the present instrument through several steps to obtain the direct readout of distance to a remote reflector 13 is controlled by function selector 99. In the first operating step incident to obtaining the distance measurement, it is desirable merely to align the transmitted light beam 31 with the remote reflector for maximum strength of the returned signal 32. Accordingly, in this aligning or aiming step, function selector 99 sets switch 102 to connect the level meter 104 to receive the output of the detector and automatic gain controller (AGC) 106 and also closes switch 108 to apply chopper signal $\beta$ to the power amplifier 49. The chopper signal serves to gate off or disable the amplifier 49 during the period shutter wheel 29 blocks transmission to reflector 13 (i.e., passes light through light pipe 37) and gates on or enables the amplifier 49 during the alternate periods. In this way, only light from the diode light source 17 which is transmitted toward and reflected back from the remote reflector 13 is received by the detector diode 43. The transmitter optics are thus positioned relative to reflector 13 for maximum gaincontrolling signal present at I.F. amplifier 57.

In the next operating step, it is desirable to balance the amplitudes of the reference and reflected signals received by detector diode 43 during alternately chopped half cycles. For this purpose, the function selector 99 sets switch 102 to receive from the output of I.F. amplifier 57 a signal that is detected and synchronously demodulated by the circuits 109. If the signal peaks or envelope of modulated signal received during one half of the chopper cycle are of different amplitude than the signal peaks or envelope of modulated signal received during the alternate half of the chopper cycle, the optical attenuator 39 in the reference path may be adjusted to equalize the intensities of the reference and reflected light signals 34 and 36 applied to the detector diode 43.

With the instrument properly aligned and adjusted, it is now possible to make the distance measurement. For this purpose function selector 99 actuates the distance-selector switch 101 positioned in the units digit place and also sets the frequency synthesizer 45 and the local oscillator 53 to produce their highest modulating frequencies (i.e., about 25 Megahertz for synthesizer 45 and about 25 Megahertz plus the reference frequency 52 of about 25 kilohertz for oscillator 53 for measurements in the English system of units). This produces a modulated light carrier signal 110 for transmission toward reflector 13 that has an effective wavelength, $l_1$, of 20 feet. Actually, the RF signal of about 25 Megahertz is adjusted in frequency to provide a wavelength of 40 feet at standard or reference temperature and pressure and the frequency doublers 85, 87 in the I.F. circuitry previously described establish the effective 20-foot wavelength. And, since this transmitted modulated light signal is folded over and reflected back at the reflector 13, variations of reflector position within the range of 0 to 10 feet produces variations in the phase angle of the reflected signal relative to the reference signal over the entire effective 20-foot dimension of a full wavelength and these variations in phase angle appear as a variation in the phase separation of the signals on output lines 61 and 63 in the manner previously described. In order to determine this phase angle and, hence, reflector position within one full wavelength, the output current from converter circuit 70 is balanced out or nulled as viewed on meter 90 by a current determined by the units-digit distance selector switch 101. This switch controls a conventional current divider which determines five discrete values of the nulling current 111 supplied by the summing amplifier circuit 113 for 10 cardinal settings of the switch 101. During adjustment of switch 101, if the actual phase separation of the signals on lines 61 and 63 is represented by a digit 0, 1 or 2 at the low end of the units scale or by a digit 8 or 9 at the high end of the units scale, then the circuit including exclusive OR-gate 86, and elements 88, 92 supplies additional current to the input of meter amplifier 84. Thus, when the units-place switch 101 is set at one of the digits 0, 1, 2 or 8, 9 the coupling between this switch 101 and switch 109 introduces a phase shift of 180° between the signals on lines 61 and 63. This causes the output of gate 86 to increase above the level at which level detector 99 supplies additional current so that adjustment of the units-place switch 101 to one of the cardinal digits may produce a null (or near-null) reading on meter 90. This assures proper operation in the center of the range of converter circuit 70 in the manner previously described.

After the units-digit distance-selector switch 101 is properly set on a cardinal digit as near to null (or below) as possible, the function selector 99 is set to activate the vernier control 100. This control supplies a current having an amplitude that is continuously adjustable over the range of one increment of the units-digit switch 101. Thus, the units digit and vernier are selected first during operation on the highest modulation frequency to determine the position of the reflector 13 within the dimensions of the shortest possible wavelength. However, this does not provide any indication of the number of full wavelengths that the reflector 13 is positioned away from the reference plane of the instrument, which reference plane may be conveniently established anywhere with respect to the present instrument simply by making a factory adjustment similar to vernier 100 against a calibrated distance.

Next, the function selector 99 is set to activate the tens-place digit selector switch 103. This setting of function selector 99 also causes the frequency synthesizer 45 to operate at a frequency that is one decade lower, namely at about 2.5 Megahertz and also causes oscillator 53 to operate at about 2.5 Megahertz plus the value of reference frequency 52 (i.e., about 25 kilohertz) from synthesizer 45. This means that the transmitted modulated light carrier signal 112 has an effective wavelength, $l_2$, of 200 feet and that the reflected modulated light signal 32 exhibits a phase separation relative to the reference modulated light signal 34 that varies from 0° to 360° for variations in relative position of reflector 13 between 0 and 100 feet. These variations in phase separation of the reflected and reference light signals 34, 36 appear as variations in the phase separation of the signals on the output lines 61 and 63, as previously described. And this phase separation of the signals on lines 61 and 63 is determined by varying the nulling current in increments controlled by the tens-place digit selector switch 103. With the tens-place digit selector switch activated, the value of current controlled by the previous switches (namely, units-place digit selector switch 101 and vernier 100) is reduced by a factor of ten to provide the proper weighting factor of the lower order settings in connection with adjustment of the higher order selector 103. The current 111 thus supplied should establish a null on meter 90 directly in response to selection of the proper tens-place cardinal digit. This selector switch 103, as with the other selector switches 101, 105 and 107, are coupled to switch 109 for introducing 180° phase shift into converter circuit 70, as previously described, when the selector switch is set at the low-end digits 0, 1 or 2 or at the high-end digits 8 or 9.

Next, the function selector 99 is set to actuate each of the remaining selector switches 105 and 107 and, for each switch, also to decrement the RF modulating signal from synthesizer 45, the frequency of oscillator 53 and the value of current selected by the preceding selector switches 103, 101, etc., for operation of the instrument in the manner previously described. This established the hundreds-place digit and thousands-place digit using modulated RF signals which respectively have effective full wavelengths of 2,000 feet and 20,000 feet. Since the RF modulating signal for determining the thousands-place digit is the reference frequency 52 (namely, about 25 kilohertz), the detector diode 43 does not operate as a mixer as on all other ranges but the remaining circuitry operates in the manner previously described. The actual distance to the remote reflector 13 within the range up to 10,000 feet (or meters) may thus be read out conveniently and directly from the settings of the digit-place selector switches and vernier 100–107 with accuracies of better than a few parts per million.

We claim:
1. Electro-optical distance measuring apparatus comprising:
   a light source and signalling means coupled thereto for producing a light beam signal having an intensity which varies between selected values at a predetermined repetition rate;
   a beam splitter disposed in the path of the light beam signal from said light source for producing first and second beams of light;
   beam-transmitting optical means coupled to receive the first beam for transmitting said first beam of light to a remote reflector disposed at the end of the distance to be measured;
   auxiliary optical means coupled to receive the second beam for transmitting the same over an auxiliary light path;
   an alternator disposed in the paths of said first and second light beams intermediate said beam-splitter and the beam-transmitting optical means and auxiliary optical means for alternately and cyclically blocking and passing the first and second light beams in phase opposition;
   receiver optical means including a photoresponsive detector disposed to receive background illumination modified alternately by the first light beam signal reflected back from said reflector and by the second light beam signal transmitted over said auxiliary light path for operation of the photoresponsive detector under more nearly uniform light bias conditions over a cycle of alternator operation; and
   electrical circuit means coupled to said photoresponsive detector for measuring the phase relationship between successive responses of said detector to the light beam signals alternately received thereby.

2. Electro-optical distance measuring apparatus as in claim 1 wherein:
   said light source is an electroluminescent diode which is operated alternately unenergized and energized at said predetermined repetition rate; and
   said receiver optical means includes an optical mixer for continuously coupling to the photoresponsive detector the background illumination and the alternating light beam signals reflected back from said reflector and transmitted over said auxiliary path.

3. Electro-optical distance measuring apparatus as in claim 2 wherein:
said light source is a gallium arsenide diode which produces light in the infrared region of the radiation spectrum when energized; and
said predetermined repetition rate is a selected multiple of one of about 2.458 kilohertz for English system of distance units and about 1.4985 kilohertz for metric system of distance units.

4. Electro-optical distance measuring apparatus as in claim 1 wherein said electrical circuit means comprises:
a plurality of digit-place selector means for providing the numerical readout in decimal form of the distance to the reflector, each of said selector means including the cardinal numbers in a decade range;
means coupled to each of said selector means for measuring said phase relationship in fixed increments per cardinal number; and
means selectably coupling each of said selector means in sequence to said signalling means for altering said predetermined repetition rate in decadic multiples from the highest repetition rate associated with the least-significant digit-place selector means to the lowest repetition rate associated with the most significant digit-place selector means to control said light source for first producing a light beam signal with intensity that varies at the highest predetermined repetition rate during selection of cardinal numbers provided by the least-significant digit-place selector means, and thereafter for producing a light beam signal with intensity that varies at successively lower decadic multiples of the highest repetition rate for each successively more-significant digit-place selector means during selection of cardinal numbers provided thereby.

5. Electro-optical distance measuring apparatus as in claim 5 wherein said electrical circuit means produces a pair of continuous wave signals which are separated in phase by a value proportional to the phase relationship between successive responses of said photoresponsive detector to the light beam signals received thereby; and comprising
means coupled to each of said selector means for producing a comparison signal having a value representative of a cardinal number provided by said selector means;
indicator means including a comparison signal input connected to receive said pair of signals for providing an indication of the relationship between the value of said phase separation and the value of a signal applied to said comparison signal input; and
switching means connected to said comparison signal input of the indicator means for applying thereto the selected combination of a comparison signal determined by a given digit-place selector means and the comparison signals determined by successively less-significant digit-place selector means decreased by successive decadic multiples corresponding to the decadic digit-place separation between a less-significant digit-place selector means and said given digit-place selector means.

6. Electrical signalling apparatus comprising:
circuit means producing first and second signals of predetermined frequency during intermittent periods that cyclically alternate at a recurrence frequency which is lower than said predetermined frequency, said first and second signals being separated in phase by a value which is to be measured:
a source of continuous wave signal having a frequency which is related by an integer factor to said predetermined frequency;
a pair of signal channels, each including a signal-controlled phase shifter connected to receive the continuous wave signal from said source, each of said phase shifters including control signal storage means connected to the control signal input thereof and including amplifier means connected to receive the output of the corresponding phase shifter;
a pair of channel selectors operating at said recurrence frequency in synchronism with the cyclically alternating intermittent periods;
a phase detector having one input and having another input connected to receive the first and second signals during the cyclically alternating intermittent periods for producing a control signal representative of the phase relationship of the signals applied thereto;
means including one of said channel selectors for applying to said one input of the phase detector alternately and cyclically selected ones of the outputs of said amplifying means; and
means including the other of said channel selectors connected to receive the control signal from said phase detector for alternately and cyclically applying control signal to the control signal storage means for each of said phase shifters during phase comparison in said phase detector of the output of one of said amplifying means with the corresponding one of the first and second signals applied to said phase detector during an intermittent period for producing at the outputs of said amplifier means a pair of continuous wave signals, each being phase-locked to the corresponding one of the first and second signals.

7. Electrical signalling apparatus as in claim 6 wherein:
said control signal storage means includes an integrator connected to supply to the corresponding phase shifter a continuous control signal having an amplitude that is cyclically determined by the control signal from said phase detector periodically applied through said other channel selector.

8. Electrical signalling apparatus for determining the phase separation of a pair of continuous wave signals, the apparatus comprising:
converter means connected to receive a pair of applied signals for producing a DC output that is proportional to the phase separation of the pair of applied signals substantially over a full cycle of phase separation;
control means manually settable at cardinal numbers over a decade range for producing a DC output proportional to the cardinal number setting of the control means;
output means connected to receive the DC outputs from said converter means and said control means for producing an indication of said DC outputs attaining a predetermined relationship to each other;
phase-shifting means for selectably shifting the phase angle of an input signal by 180°
means including said phase-shifting means connected to said converter means for applying thereto a pair of continuous wave signals the phase separation between which is to be determined and for selectively shifting one of said pair or continuous wave signals by 180° with respect to the other of said pair of continuous wave signals; and
means coupling said phase-shifter means to said control means for introducing said 180-degree phase shift in response to the manual setting of said control means to predetermined ones of the cardinal numbers of the decade range for maintaining operation of said converter means substantially within the central region of its phase separation-to-DC output operating range.

9. Electrical signalling apparatus as in claim 8 wherein:
said cardinal numbers in a decade range of said control means are arranged in a first group including the numbers 0, 1, 2, 8 and 9 and in a second group including the remaining cardinal numbers of a decade range not contained in the first group; and
said phase shifting means coupled to said control means selectively introduces 180° phase shift in response to manual setting of said control means on a cardinal number in one of said groups.

10. Electrical signalling apparatus as in claim 9 comprising:

an error-sensing circuit including a logic converter connected to receive signals applied to said converter means for producing a DC logic output which varies in direct proportion to phase separation of said signals in the range from about 0° to about 180° and which varies inversely thereafter in proportion to phase separation of said signals in the range from about 180° to about 360°;

a level-sensing means connected to said logic converter and to said output means for supplying a signal thereto in response to the logic output of said logic converter attaining a selected value to alter the output indication provided by said output means independent of the values of said DC outputs supplied thereto.

11. Electrical signalling apparatus as in claim 10 wherein:
said level-sensing means supplies a signal to said output means for phase separation of signals supplied to said converter means that are represented by settings of said control means at cardinal numbers included in said first group.

* * * * *

UNITED STATES PATENT OFFICE
CERTIFICATE OF CORRECTION

Patent No. 3,619,058                    Dated November 9, 1971

Inventor(s) William R. Hewlett and Gregory Justice

It is certified that error appears in the above-identified patent and that said Letters Patent are hereby corrected as shown below:

Column 2, line 73, "$2 \times 10^{112}$" should read -- $2 \times 10^{-12}$ --;

Column 3, line 6, "of I.F." should read -- or I.F. --;

Column 4, line 12, after "is" insert -- applied --;

Column 5, line 37, "99" should read -- 92 --;

Column 6, line 21, "established" should read -- establishes --;

Column 7, line 39, "5 wherein" should read -- 4 wherein --;

Column 8, line 50, after "180°" insert -- ; --.

Signed and sealed this 16th day of May 1972.

(SEAL)
Attest:

EDWARD M. FLETCHER, JR.                ROBERT GOTTSCHALK
Attesting Officer                      Commissioner of Patents